United States Patent
Gretter et al.

(10) Patent No.: US 7,562,010 B1
(45) Date of Patent: Jul. 14, 2009

(54) GENERATING CONFIDENCE SCORES FROM WORD LATTICES

(75) Inventors: Roberto Gretter, Hoboken, NJ (US); Giuseppe Riccardi, Hoboken, NJ (US)

(73) Assignee: AT&T Intellectual Property II, L.P., New York, NY (US)

( * ) Notice: Subject to any disclaimer, the term of this patent is extended or adjusted under 35 U.S.C. 154(b) by 351 days.

(21) Appl. No.: 11/426,225

(22) Filed: Jun. 23, 2006

Related U.S. Application Data

(63) Continuation of application No. 10/254,217, filed on Sep. 25, 2002, now Pat. No. 7,092,883.

(60) Provisional application No. 60/368,834, filed on Mar. 29, 2002.

(51) Int. Cl.
G06F 17/27 (2006.01)
G10L 15/00 (2006.01)
G10L 15/04 (2006.01)
G10L 15/18 (2006.01)

(52) U.S. Cl. .................... 704/9; 704/231; 704/251; 704/257

(58) Field of Classification Search .............. None
See application file for complete search history.

(56) References Cited

U.S. PATENT DOCUMENTS

| | | | | |
|---|---|---|---|---|
| 4,591,980 A * | 5/1986 | Huberman et al. | ............ | 712/16 |
| 4,713,777 A * | 12/1987 | Klovstad et al. | ............ | 704/233 |
| 4,713,778 A * | 12/1987 | Baker | .......... | 704/254 |
| 4,718,094 A * | 1/1988 | Bahl et al. | .................. | 704/256 |
| 5,969,894 A * | 10/1999 | Howell et al. | ................. | 360/51 |
| 6,021,383 A * | 2/2000 | Domany et al. | ............. | 702/181 |
| 6,812,873 B1 * | 11/2004 | Siohan et al. | ............... | 341/107 |
| 7,092,883 B1 * | 8/2006 | Gretter et al. | ............... | 704/242 |
| 2002/0065959 A1 * | 5/2002 | Kim et al. | ...................... | 710/1 |

\* cited by examiner

*Primary Examiner*—David R Hudspeth
*Assistant Examiner*—Brian L Albertalli

(57) ABSTRACT

Systems and methods for determining word confidence scores. Speech recognition systems generate a word lattice for speech input. Posterior probabilities of the words in the word lattice are determined using a forward-backward algorithm. Next, time slots are defined for the word lattice, and for all transitions that at least partially overlap a particular time slot, the posterior probabilities of transitions that have the same word label are combined for those transitions. The combined posterior probabilities are used as confidence scores. A local entropy can be computed on the competitor transitions of a particular time slot and also used as a confidence score.

21 Claims, 3 Drawing Sheets

GENERATING CONFIDENCE SCORES FROM WORD LATTICES

RELATED APPLICATIONS

This application claims the benefit of U.S. Provisional Patent Application Ser. No. 60/368,834, entitled "System and Method of Using Word Lattice Based Algorithms for Generating a Confidence Score in Automatic Speech Recognition" and filed Mar. 29, 2002, and also claims the benefit of U.S. patent application Ser. No. 10/254,217, filed Sep. 25, 2002, which are incorporated herein by reference.

BACKGROUND OF THE INVENTION

1. The Field of the Invention

The present invention relates to systems and methods for generating confidence scores. More particularly, the present invention relates to systems and methods for generating confidence scores from word lattices.

2. Background and Relevant Art

Confidence scores play an important role in a variety of different technologies such as speech recognition systems and dialog systems and are particularly important in unsupervised learning, active learning, and word understanding. Generally, confidence scores are used to determine whether a word was recognized or understood correctly and enables certain actions to be taken. In a speech recognition system, for example, confidence scores represent how sure the speech recognition system is that the words were recognized correctly.

In the last decade, people have been working on two fundamentally different approaches for computing confidence scores. The first approach is based on acoustic measurements. The acoustic-based approach uses a two-pass algorithm on the speech. The first pass computes the best word hypotheses. The best word hypotheses are then re-scored to compute the confidence scores for each word in the best hypotheses. The first pass uses standard acoustic models, while the second pass uses acoustic models that normalize the log-likelihood functions. The acoustic approach is data-driven and requires the speech recognition system to explicitly model the acoustic channel.

The second approach for computing confidence scores is a lattice-based approach. In general, data can be organized or transformed into a lattice structure where each transition of the lattice represents a flot. Confidence scores can be assigned to each flot and those confidence scores can be used to determine which flots are preferable. However, lattices can be quite complex and it is often beneficial to reduce the complexity of a lattice. Simplifying the structure of a lattice can be done in a variety of different ways that are known in the art. Significantly, reducing the complexity of a lattice often results in lost data, which corresponds to less accurate confidence scores. Because a lattice can represent different types of data, confidence scores are relevant to many technologies, including dialog management, parsing technologies, and speech recognition.

In a lattice-based approach, confidence scores are typically computed in a single pass. The lattice-based approach does not require the transition hypotheses to be re-scored and is portable across various tasks and acoustic channels. In addition, the lattice based approach requires no training and is suitable for unsupervised or on-line learning.

For example, a word lattice is often used in speech recognition and one word lattice-based approach computes word posterior probabilities or confidence scores for a lattice structure that is referred to herein as a "sausage." The sausage corresponds to the confusion networks created from the word lattice output of a speech recognizer. A sausage is thus a simplification of the original word lattice and has a particular topology. As a result, some of the original data is lost when the original word lattice is transformed into a sausage and the confidence scores generated from the sausage are therefore less reliable. FIG. 1, for example, illustrates a sausage 102 or the confusion networks created from the lattice 100.

As illustrated, the topology of the sausage 102 is more straightforward than the topology of the word lattice 100. The sausage 102 is a sequence of confusion sets, where each confusion set is a group of words that compete in the same time interval. Each word has a posterior probability, which is the sum of the probabilities of all the paths of that word occurrence in the lattice 100. In each confusion set, the sum of all posterior probabilities equals one. In addition, the sausage 102 preserves the time order of words, but loses the time information. One advantage of the sausage 102 is that it tends to minimize the Word Error Rate (WER) rather than the Sentence Error Rate (SER).

The sausage is formed by taking a word lattice as input and performing the following steps. First, the low probability links are pruned from the word lattice. A posterior probability for each link in the word lattice is then computed. Next, different occurrences of the same word around the same time interval are merged (intra-word clustering) and their posterior probabilities are summed. Finally, different words which compete around the same time interval are grouped (inter-word clustering) and confusion sets are formed as illustrated in FIG. 1.

A consensus hypothesis, which is the word sequence obtained by choosing a word from each confusion set with the highest posterior probability, can be easily extracted from the sausage 102. The consensus word hypothesis of the sausage 102, however, may vary from the best path hypothesis inside the word lattice 100. The posterior probability estimates of words in the sausage are used as word confidence scores.

In addition to the posterior probability, a local entropy can also be used as a confidence score. The local entropy is computed on each confusion set and accounts for more information than the posterior probability. The local entropy uses both the posterior probability of the winning word as well as the distribution of the posterior probabilities of competing words. In these examples, however, obtaining confidence scores for a word lattice requires that the lattice first be transformed into a set of confusion networks. This results in a loss of time information and does not account for the posterior probabilities of links that were pruned from the original word lattice. In addition, the consensus word hypothesis of the sausage may not correspond to the best path hypothesis of the original lattice from which the sausage was constructed.

BRIEF SUMMARY OF THE INVENTION

These and other limitations are overcome by the present invention which relates to systems and methods for determining confidence scores directly from a word lattice. One of the advantages of the present invention is that the word lattice does not need to be transformed into another more structured graph. The present invention enables both word posterior probabilities and word entropies computed on a word lattice or word graph to be utilized as confidence scores.

Obtaining confidence scores begins by determining the posterior probability for each transition of the word lattice. This is achieved, for example, by applying a forward-backward method to the word lattice or graph and combining the local likelihoods. Next, time slots are defined that are not necessarily dependent on the topology of the word lattice. All transitions of the word lattice that are completely or partially within a particular time slot are competitors. However, competitor transitions that have the same word label within the particular time slot are allies. The posterior probabilities of the allies of the particular time slot are summed to obtain the posterior probability of a word w. One advantage of summing the posterior probabilities of allies is that the contributions of words that have different time alignments are not excluded from the confidence score. Confidence scores can also be computed using local entropy, which is computed on the list of competitors in a time slot.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Confidence scores, in speech recognition, indicate whether speech or words have been recognized correctly. Computing confidence scores using an acoustic approach is data-intensive and requires an explicitly modeled acoustic channel. Computing a confidence score from a word lattice, on the other hand, is suitable for unsupervised learning and requires no training. A word is considered to be correctly recognized if the posterior probability for that word is higher than some threshold. Word confidence scores are important aspects for unsupervised learning in automatic speech recognition.

While the present invention is described with reference to automatic speech recognition systems and word lattices, it is understood by one of skill in the art that the systems and methods described herein can apply to other technologies, such as dialog management systems, parsing tasks, text-to-speech generation, and the like. The systems and methods described herein are further not limited to word lattices but can be applied to other lattices as well where the transitions represent phonemes or other flot.

The present invention thus relates to systems and methods for obtaining a confidence score directly from a word lattice or graph and more generally to systems and methods for obtaining confidence scores from a lattice or other automata. Usually, a speech recognition system receives speech input and produces a word lattice as output. In one embodiment of the present invention, the word lattice is not transformed into a simpler lattice where timing information about the phonemes or transitions is lost. Rather, the contributions of transitions that are related to the same time slot are combined while retaining, in one example, timing information.

Figure 1:
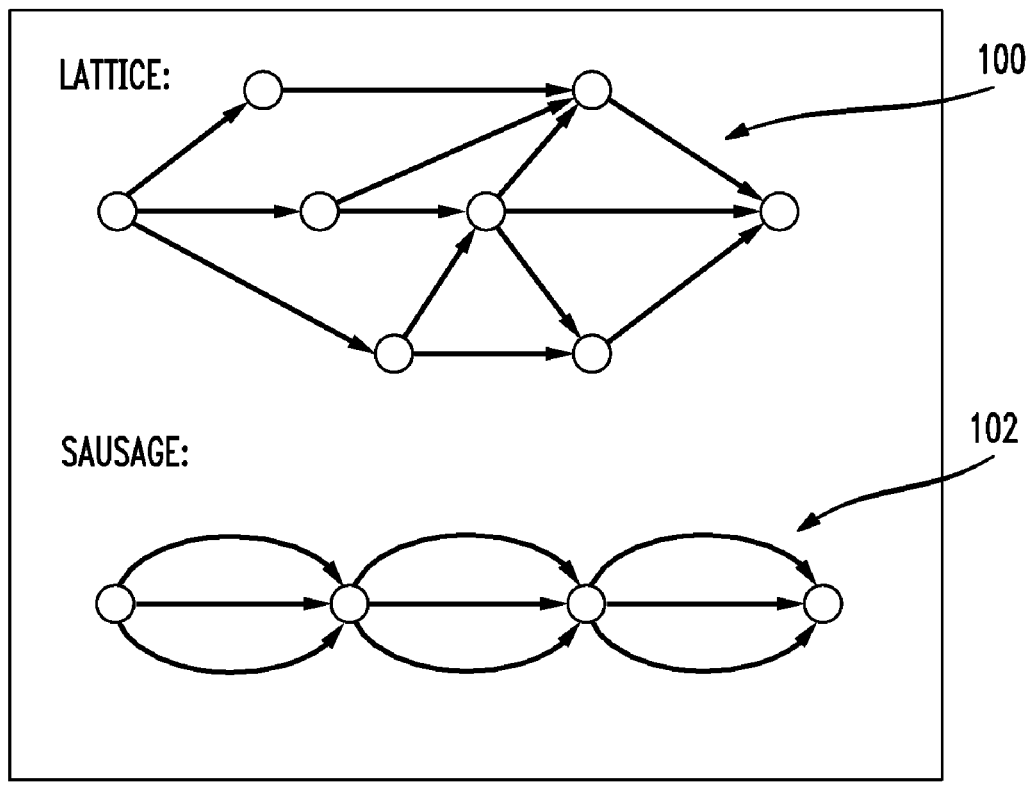
FIG. 1 illustrates a word lattice that is converted to a group of confusion sets.
Figure 2:
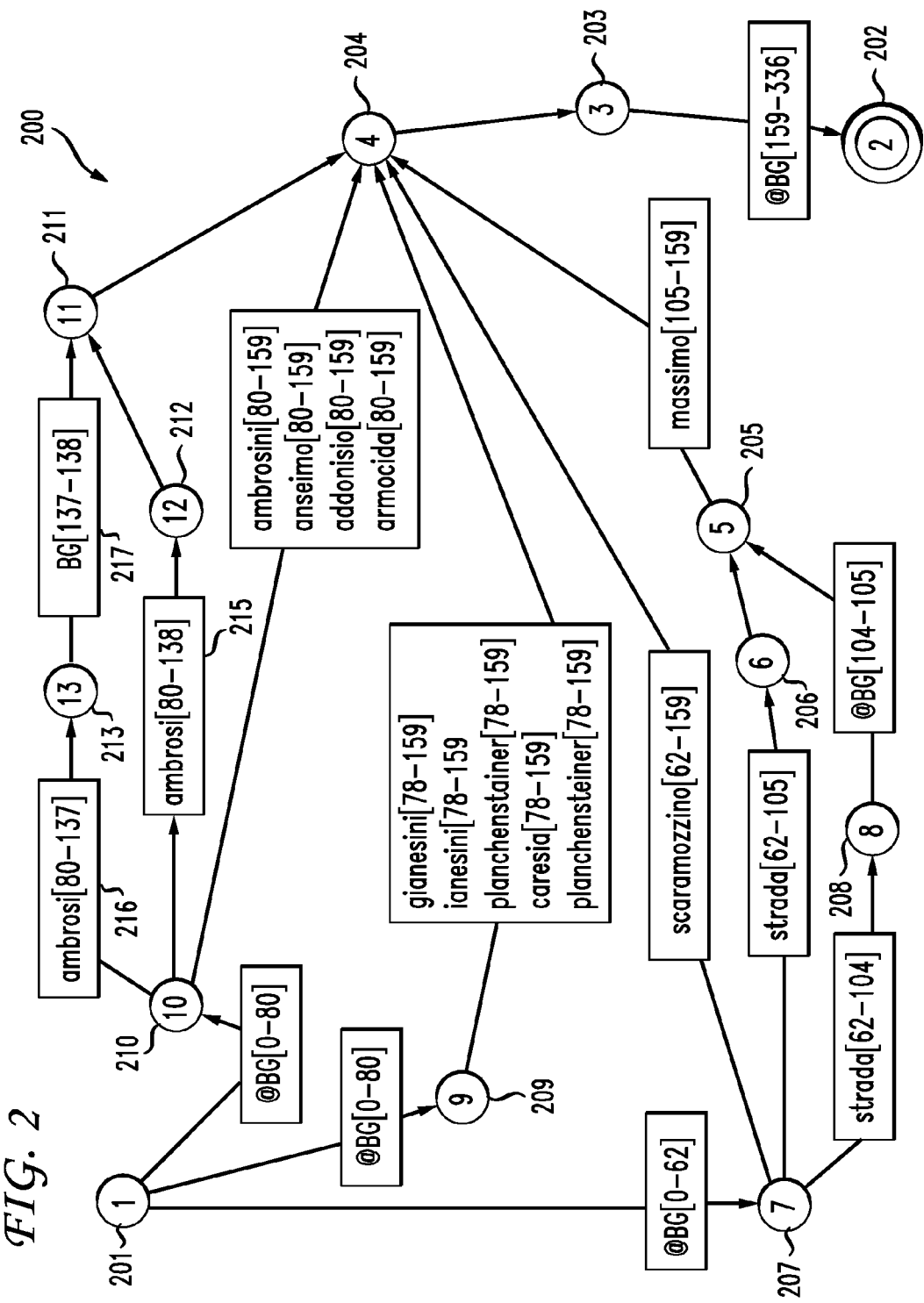
FIG. 2 is a block diagram of a word lattice and illustrates the time frames for each transition in the word lattice.

FIG. 2 illustrates an exemplary word lattice that was produced, for example, by a speech recognition system. The word lattice 200 reflects the syntactic constraints of the grammar used during recognition. The word lattice 200 is made of states, shown as state 201 through state 213, and illustrates the transitions connecting the states. Each transition has a word label that usually corresponds to a recognized word (@BG means silence) or other phoneme and has, in this embodiment, at least the following information associated with it:

first and last time frame, as resulting from Viterbi alignment (appended to each word and surrounded by square brackets in FIG. 2); and the local likelihood, i.e., the sum of the acoustic and language model contribution for that word in that temporal segment, scaled down by a factor that approaches the language model weight.

In addition, a word label identifies the speech, word, or phoneme associated with a transition and is not required to be a recognized word. The speech that was recognized by a speech recognition system can be obtained by concatenating the word labels of a particular path.

By applying a forward-backward algorithm to the word lattice 200 and combining the local likelihoods, the posterior probability for each transition or word label is computed. At this point, the posterior probability of a transition or word label could be used as a confidence score for that word label. However, the confidence scores are improved by accounting for the competing word labels in the same time slot.

Figure 3:
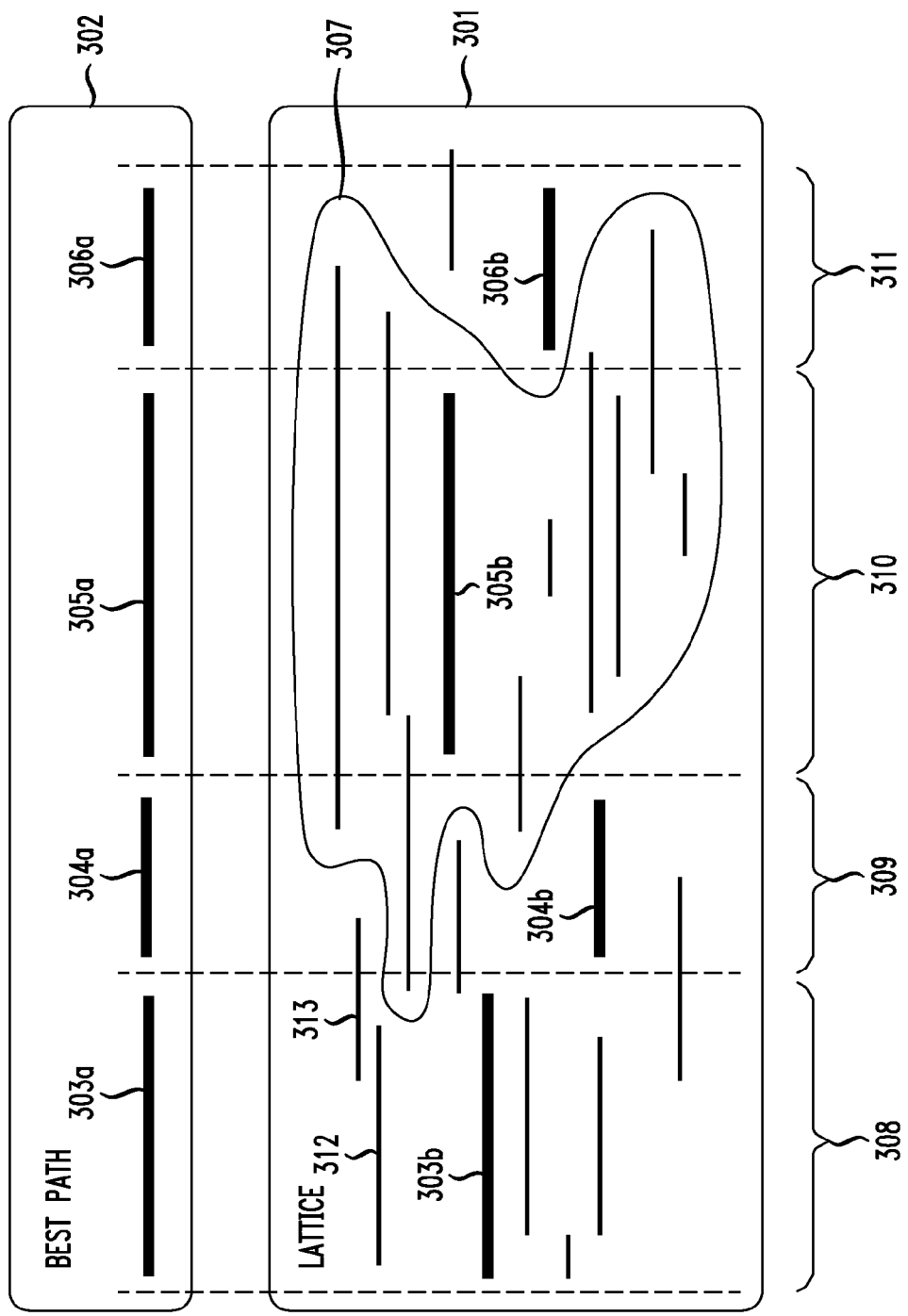
FIG. 3 is a block diagram illustrating competitor and/or ally transitions that belong to the same time slot.

FIG. 3 is a block diagram that illustrates competitor transitions and ally transitions that are used to compute confidence scores. In FIG. 3, one or more time slots ts(T) of transition T are defined. For this example, FIG. 3 illustrates the time slots 308, 309, 310, and 311. Each time slot is the speech interval between the starting and ending time frames of T, regardless of graph topology. In the embodiment of FIG. 3, the time slots correspond to the transitions of the best path 302 of the word lattice. In this example, the first time slot 308 corresponds to the starting and ending frame times of the transition 303a, the next time slot 309 corresponds to the starting and ending frame times of the transition 304a, the time slot 310 is bounded by the starting and ending frame times of the transition 305a, and the time slot 311 is defined by the starting and ending time frames of the transition 306a. The time slots, however, are not required to correspond to the transitions of the best path 302.

Other transitions of the word lattice 301 are also illustrated in FIG. 3. Some of the transitions fall completely within the defined time slots 308-311 (such as the transitions of the best path in this example), while other transitions are partially included in more than one time slot. For example, the transition 303b of the word lattice 301 is in the time slot 308 as previously described. The transition 312 is also within the time slot 308 even though the starting and ending time frames of the transition 312 may be different than the starting and ending time frames of the transition 303. The transition 313, on the other hand, falls within both the time slot 308 and the time slot 309 of the word lattice 301.

Each transition that partially or completely overlaps a particular transition or time slot is a competitor in that time slot. The line 307 encircles all the transitions that overlap the time slot 310 or the transition 305. All transitions within the line 307 are competitors for the time slot 310. All competitors within the line 307 that have the same word label are allies while those transitions with different word labels remain competitors. For a given transition, such as transition 305b, some of the transitions that overlap or are included in the time slot 310 are competitors of the transition 305b, while some of the transitions may be allies of the transition 305b. FIG. 3 thus illustrates all of the competitors and/or allies for a word or phoneme of the best path in each time slot.

The posterior probabilities of the allies within the time slot 310 are summed to obtain the posterior probability of a particular label. For example, the posterior probabilities of the allies of the transition 305b are summed to obtain the posterior probability of the word w, which is the label of the transition 305b. By combining the posterior probabilities of allies, contributions of word(s) that are aligned differently are included in determining the confidence score.

With reference to FIG. 2, for example, there is a transition 215 that has a label ambrosi that is the same as the label of the transition 216. The transition 215 and the transition 216 differ in part because they belong to different paths in the word lattice. The transition 217 (a small silence), for example, is inserted between the transition 216 and the transition 218, whereas the transition 218 directly follows the transition 215. In this example, the transitions 216 and 217 are allies and their posterior probabilities are summed, which results in a better estimate of the posterior probability of the word ambrosi. The posterior probabilities obtained directly from the word lattice can then be used as confidence scores. For a given time slot, more than one transition may have ally transitions. Thus, combining the posterior probabilities of ally transitions is not limited to a specific transition but includes all transitions that have ally transitions within a particular time slot.

Another quantity that can be used as a confidence score is a local entropy, computed on the list of competitors in a time slot:

$$H = -\Sigma_{w_i \in ts(T)} \text{post}(w_i) \times \log(\text{post}(w_i))$$

where ts(T) is the time slot corresponding to a transition of the best path and post ($w_i$) is the sum of the posterior of all the competitors/allies having the same word label (each transition is counted only once inside a ts(T)).

The present invention extends to systems and methods for computing a confidence score for transitions of a word lattice. The embodiments of the present invention may comprise a special purpose or general-purpose computer including various computer hardware, as discussed in greater detail below. Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Computer-executable instructions also include program modules which are executed by computers in stand alone or network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for determining confidence scores for the labels in a lattice that has one or more transitions that each have a label, the system comprising:
    a module configured to determine a posterior probability for each transition of the lattice;
    a module configured to define one or more time slots for the lattice, wherein one or more transitions is at least partially included in each one or more time slots; and
    a module configured to, for each transition that is at least partially included in a particular time slot, combine the posterior probabilities of all transitions that have the same label to obtain a confidence score for that label.

2. A system as defined in claim 1, wherein the module configured to determine a posterior probability for each transition of the lattice further applies a forward-backward algorithm to the lattice.

3. A system as defined in claim 1, wherein the module configured to define one or more time slots for the lattice further define one or more time slots independently of a topology of the lattice.

4. A system as defined in claim 1, wherein each label is a word or a phoneme.

5. A system as defined in claim 1, wherein the one or more time slots correspond to transitions of a best path in the lattice.

6. A system as defined in claim 1, further comprising a module configured to identify ally transitions in each time slot and identify competitor transitions in each time slot.

7. A system as defined in claim 6, further comprising a module configured to compute a local entropy on competitor transitions in each time slot.

8. A system for determining word confidence scores for word labels in a word lattice generated from speech input and having one or more transitions, the system comprising:
- a module configured to apply a forward-backward algorithm to the word lattice to determine a posterior probability for each transition of the word lattice, wherein each transition has a word label;
- a module configured to define one or more time slots, wherein each time slot has a starting time frame and an ending time frame; and
- a module configured to, for transitions of the word lattice that overlap a particular time slot, combine the posterior probabilities of all transitions that have the same word label, wherein the combined posterior probabilities are a confidence score for the word labels of those transitions.

9. A system as defined in claim 8, wherein the module configured to apply a forward-backward algorithm to the word lattice further combines local likelihoods in order to compute the posterior probabilities of each transition.

10. A system as defined in claim 8, wherein the module configured to define one or more time slots further define one or more time slots using starting time frames and ending time frames that correspond to transitions of a best path of the word lattice.

11. A system as defined in claim 8, wherein the module configured to define one or more time slots further defines one or more time slots independently of a topology of the word lattice.

12. A system as defined in claim 8, wherein the module configured to combine the posterior probabilities of all transitions that have the same word label further identifies both ally transitions and competitor transitions for each transition that overlaps the particular time slot, wherein ally transitions have the same word label.

13. A system as defined in claim 8, wherein the module configured to combine the posterior probabilities of all transitions that have the same word label further sums posterior probabilities for ally transitions.

14. A system as defined in claim 13, further comprising a module configured to compute a local entropy on competitor transitions of the particular time slot.

15. A system for computing word confidence scores for the word labels that are included in a word lattice generated from a speech recognition system that does not require training, the word lattice having one or more transitions that each have a word label, the system comprising:
- a module configured to determine one or more time slots for the word lattice, wherein each transition of the word lattice overlaps at least one time slot and wherein each transition in the word lattice has a posterior probability;
- a module configured to, for each time slot:
  - identify transitions that have the same word label; and
  - sum posterior probabilities of transitions that have the same word label to obtain a word confidence score for those word labels.

16. A system as defined in 15, wherein the module configured to determine one or more time slots for the word lattice further:
- applies a forward-backward algorithm to the word lattice; and
- combines local likelihoods to determine posterior probabilities for each word label of each transition of the word lattice.

17. A system as defined in claim 15, wherein the module configured to identify transitions that have the same word label further identifies transitions that have the same word label from a set of transitions, wherein the set of transitions includes all transitions that at least partially overlap the time slot.

18. A system as defined in claim 15, wherein the module configured to sum posterior probabilities of transitions further sums posterior probabilities of ally transitions.

19. A system as defined in claim 15, further comprising a module configured to compute a local entropy on competitor transitions of a particular time slot, wherein competitor transitions have different word labels.

20. A system as defined in claim 15, wherein the module configured to determine one or more time slots for the word lattice further determines one or more time slots independently of a topology of the word lattice.

21. A system for determining word confidence scores for word labels in a word lattice generated by a speech recognition system, wherein the word lattice has one or more transitions that each have a word label, the system comprising:
- a module configured to define one or more time slots that correspond to transitions of a best path of the word lattice, wherein each time slot has a starting time frame and an ending time frame;
- a module configured to identify ally transitions and competitor transitions for each time slot, wherein ally transitions have the same word label and wherein competitor transitions have different labels; and
- a module configured to compute a local entropy on competitor transitions in each time slot, wherein the local entropy is a confidence score for the word labels of the competitor transitions.

* * * * *